T. UTLEY.
SHIP'S LIGHT.
APPLICATION FILED OCT. 12, 1920.
1,429,379.
Patented Sept. 19, 1922.
4 SHEETS—SHEET 1.
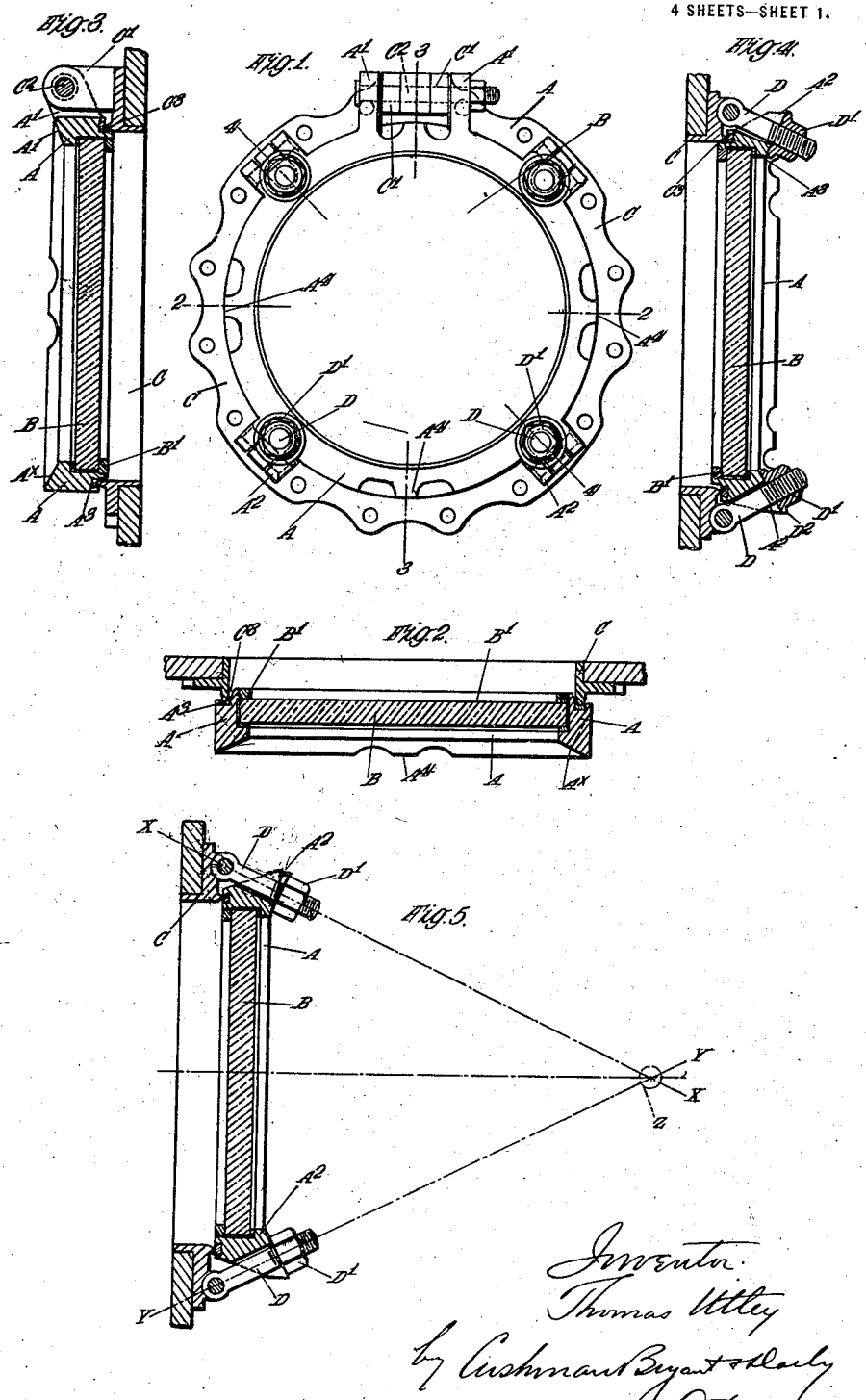

T. UTLEY.
SHIP'S LIGHT.
APPLICATION FILED OCT. 12, 1920.
1,429,379.
Patented Sept. 19, 1922.
4 SHEETS—SHEET 2.
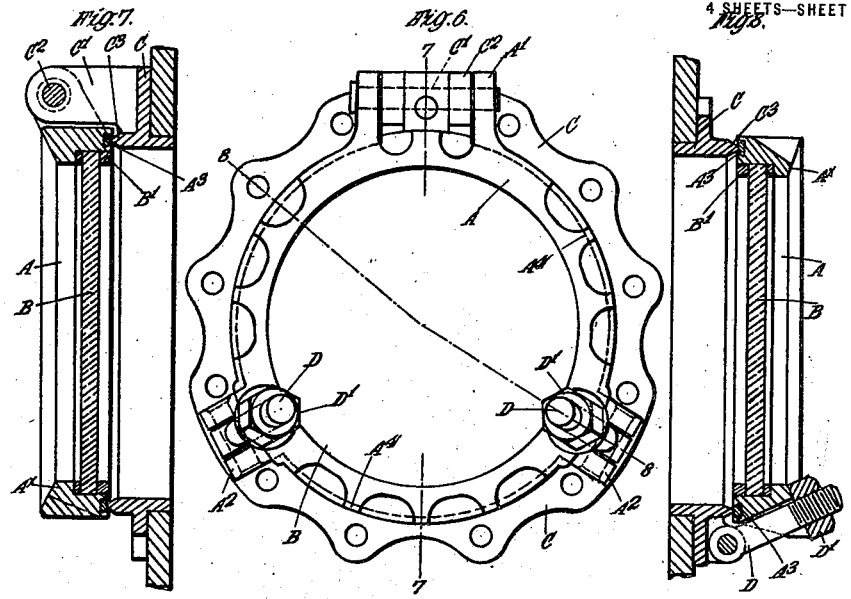
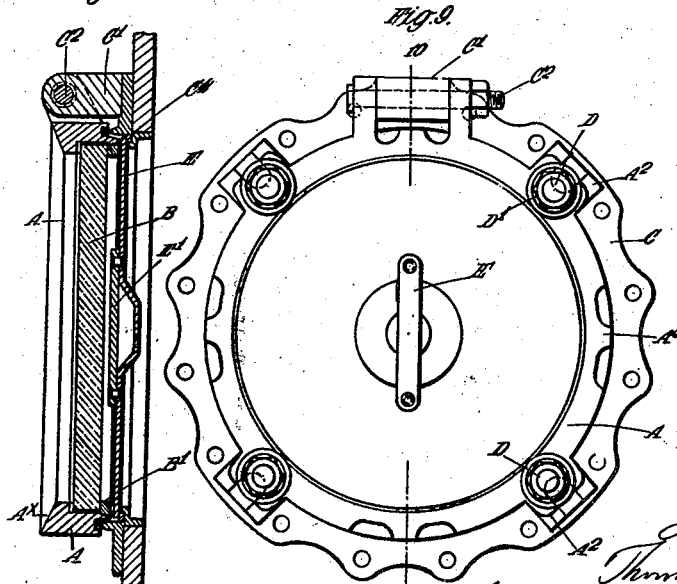
Inventor
Thomas Utley
by Cushman Bryant & Darby
Attorneys T. UTLEY.
SHIP'S LIGHT.
APPLICATION FILED OCT. 12, 1920.
1,429,379.
Patented Sept. 19, 1922.
4 SHEETS—SHEET 3.
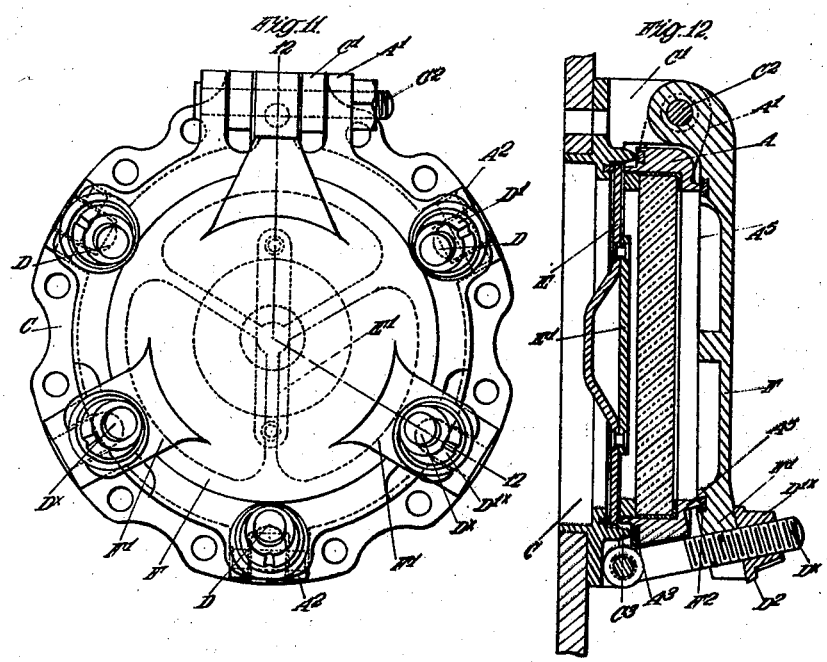
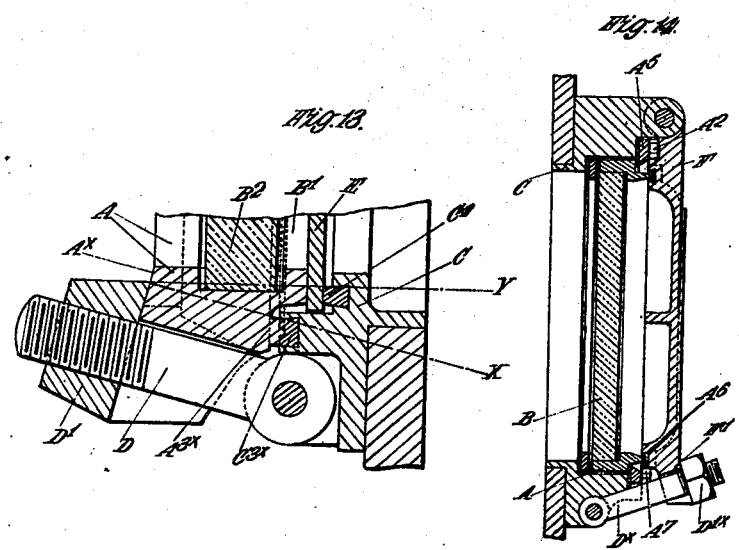
Inventor
Thomas Utley
by Cushman, Bryant & Darby
Attys.

T. UTLEY.
SHIP'S LIGHT.
APPLICATION FILED OCT. 12, 1920.
1,429,379.
Patented Sept. 19, 1922.
4 SHEETS—SHEET 4.
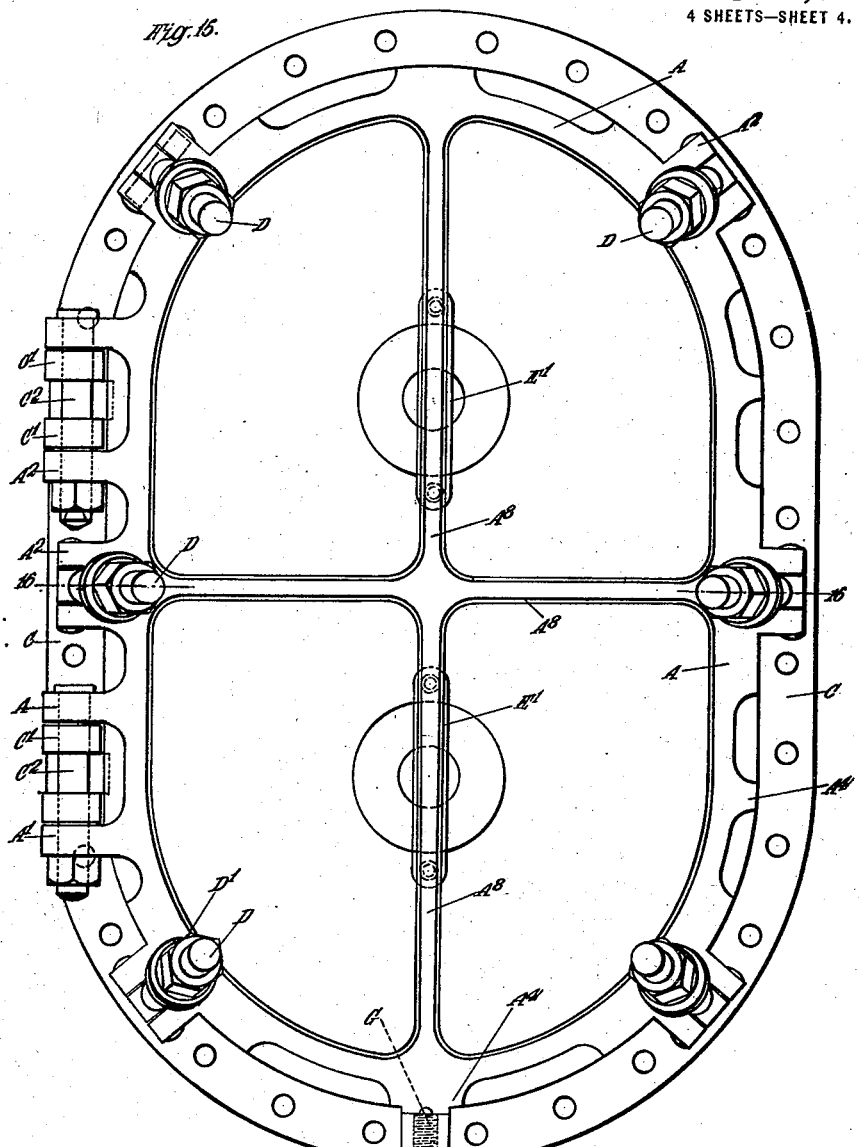
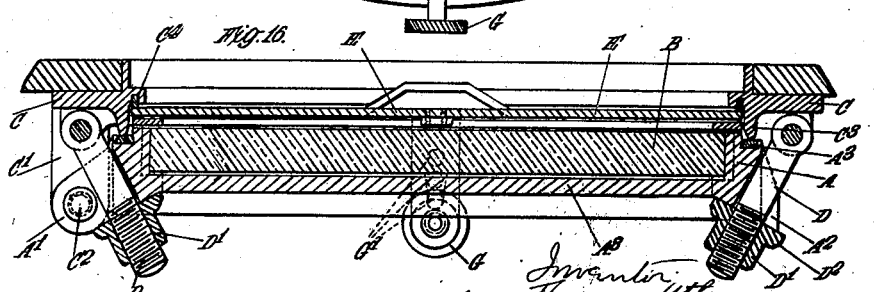

Patented Sept. 19, 1922.

1,429,379

UNITED STATES PATENT OFFICE.

THOMAS UTLEY, OF LIVERPOOL, ENGLAND.

SHIP'S LIGHT.

Application filed October 12, 1920. Serial No. 416,477.

*To all whom it may concern:*

Be it known that I, THOMAS UTLEY, a subject of the King of Great Britain, residing at Sefton House, Crosby Green, West Derby, Liverpool, in the county of Lancaster, England, have invented certain new and useful Improvements in Ships' Lights, of which the following is a specification.

This invention relates to ships' lights and has more particular reference to those lights wherein the glass is mounted in a holder or frame which is hinged to the main frame secured to the ship's hull or the like and which is formed with retaining lugs adapted to receive swing or eye bolts pivoted to the main frame by means of which bolts and suitable nuts thereon the glassholder can be retained in the closed position. Usually the front or inboard surface of the glass holder and the retaining lugs and hinge lugs thereon is flat and the plane of the said surface is parallel with the plane of the glass.

According to this invention the outer surfaces of the retaining lugs and if desired the hinge lugs are bevelled or inclined so that the outer ends thereof are further away from the plane of the glass than the inner portions of the said lugs. The front or inboard marginal surface of the glass holder is, in most cases inclined or bevelled in the same direction as the lugs are inclined or bevelled and is preferably flush with the bevelled surfaces of the lugs. The retaining lugs may be slotted to receive the securing means such as swing or eye bolts pivoted to the main frame and the said slots are so arranged as to enable the bolts to assume an inclined position relatively to the main frame instead of being at right angles thereto as is usual, thereby enabling the nuts on the threaded ends of the bolts to bear evenly on the inclined or bevelled outer surface of the retaining lugs. Owing to the bevelled or inclined surfaces of the lugs a much greater pressure can be exerted on the portion of the glass holder which comes into contact with the seating on the main frame, than can be obtained with the usual construction without distorting or bending the glass holder.

In an ordinary light there is a tendency for the nuts to slip on the flat lugs under external pressure or even when screwing up with the result that the pressure with which the glass holder is retained against its seating on the main frame tends to be diminished and the efficiency of the closure impaired owing to the clamping pressure approaching the outer parts of the lugs. In the present invention however any tendency for the nuts to slip or climb up the bevelled surfaces of the lugs would in fact be an advantage for the reason that the glass holder would be held with greater pressure against the main frame, so that the efficiency of the seating or bedding of the glass holder against the main frame would automatically increase with increasing external pressure (or clamping pressure) as the thrust or pull is retained at the base or inner part of the lugs, that is, more towards the centre of the glass holder. Further, in the present invention, centralization of the angle of pull or resistance of the nuts is obtained thereby enabling the glass holder to be automatically centred on its seating and thus compensate for any wear and tear at the hinge which in an ordinary light would cause inaccurate seating.

Although the invention is primarily intended for ships' lights having hinged glass holders it may be applied to the hinged covers or dead lights such as used on fixed or non-opening lights or on opening lights as such covers or dead lights may be provided with bevelled or inclined retaining lugs.

In order that the said invention may be more clearly understood and readily carried into effect, I will describe the same more fully with reference to the accompanying drawing in which:—

Figure 1 is a front or inboard view of one type of opening side light constructed in accordance with the present invention.

Figures 2, 3 and 4 are sectional views of the light shown in Figure 1 taken on the lines 2—2, 3—3 and 4—4 respectively Figure 5 is a diagram hereinafter referred to.

Figure 6 is a similar view to Figure 1 showing a slightly different type of opening light.

Figures 7 and 8 are sectional views of the light shown in Figure 6 taken on the lines 7—7 and 8—8 respectively.

Figures 9 and 10 are respectively a front view and a sectional view (taken on the line 10—10 of Figure 9), showing an opening light with a closing plate or plug.

Figures 11 and 12 are respectively a front view and a sectional view (taken on the line 12—12 of Figure 11) showing an opening light with a closing plate or plug and a hinged cover or dead light.

Figure 13 is an enlarged fragmentary sectional view of a modification hereinafter referred to.

Figure 14 is a vertical sectional view of one construction of fixed or non-opening light having a hinge cover or dead light which is provided with bevelled retaining lugs.

Figures 15 and 16 are respectively a front view and a sectional view (taken on the line 16—16 of Figure 15) of a construction of opening light which is fitted in ships' saloons or state cabins.

A is the glass-holder containing the glass plate B which is fitted and retained in position against an abutment on the holder A by a ring B' screwed into the inboard side of the glass holder in the usual manner. C is the main frame which may be secured to the ship's side in any suitable or usual manner and carries in lugs C', the hinge pin $C_2$ on which the hinge lugs A' on the glass holder are fitted so that the latter may be angularly movable on the hinge pin to open or close the light. The glass holder A is also provided with forked retaining lugs $A^2$ in which swing or eye bolts D hinged to the main frame are adapted to fit so that nuts D' on the threaded ends of the said bolts may bear on the front or inboard surfaces of the retaining lugs $A^2$ to exert the necessary pressure on the glass holder and cause a rubber ring or seating $A^3$ usually fitted in the glass holder to bear against a flanged ring $C^3$ on the main frame as shown in most of the examples illustrated in the drawings. In some cases however for example as shown in Figure 13 a rubber ring $C^{3x}$ may be fitted in the main frame so as to be engaged by a projecting ring or flange $A^{3x}$ in the holder. As shown in the drawings, particularly in the various sectional views the inboard marginal surface of the glass holder is bevelled or inclined outwardly from the inner circumferential edge to the outer circumferential edge as shown at $A^x$, this bevelled surface $A^x$ is clearly shown for example in Figure 2. The hinge lugs A' are also each formed with a bevelled surface forming a continuation of the bevelled surface $A^x$ on the glass holder as shown for example in Figure 3. Similarly the retaining lugs $A^2$ are each formed with a bevelled surface which is a continuation of the bevelled surface $A^x$ on the glass holder as shown in Figure 4. Thus the whole of the front or inboard surface of the glass holder is bevelled or inclined, but the bevelled surfaces of the lugs are straight that is to say they are not cupped or curved as they would be if the bevelled circular surface of the glass holder were merely extended. Thus by forming the retaining lugs with a straight bevelled surface a proper bearing is provided for the flat bottoms or bearing surfaces of the retaining nuts. The notches or slots in the retaining lugs $A^2$ are formed to enable the swing or eye bolts D on the main frame to be inclined inwardly towards the axis of the light, so that the bearing surfaces of the nuts D' on the bolts D can bear evenly on the straight bevelled surfaces of the retaining lugs, and by making the straight bevelled surfaces exactly the same on all the lugs the bolts will take up the same angular or inclined position relatively to the axis or centre of the light thus centralizing the angle of pull of the nuts and automatically centering the glass holder on its seating. By reason of the bevelled surfaces the glass holder is considerably strengthened and the likelihood of distortion of the glass holder as may occur in heavy seas and of distortion or tendency due to clamping pressure by screwing the nuts D' hard against the retaining lugs $A^2$ are avoided or mitigated. The thrust or force exerted by the screwing up of the nuts acts almost directly on the joint between the main frame and the glass holder thereby producing an efficient water tight closure. Tests which have been made prove that this improved light is capable of withstanding considerable external pressure much in excess of that which can be resisted by existing lights so much so that a cheaper and lower quality metal and a thinner glass plate than ordinarily employed can be used in any given size of light without detrimentally affecting the strength of the light, in fact the improved light of a given size constructed of lower quality metal and having a thinner glass plate can be made more efficient than an ordinary light of the same size employing higher quality of metal and a thicker glass plate, owing to the enormous increase in strength and better closure afforded by reason of the bevelled surface.

The diagram shown in Figure 5 shows how the centralization of the angle of pull of the nuts and securing bolts is obtained the dotted lines X X and Y Y representing the angle of pull or pressure due to the nuts bearing on the bevelled surfaces of the lugs intersect at a point Z co-axial or central with the light which point represents the centralization of the angle of pull or pressure. Under all conditions this arrangement permits of the glass holder being accurately centred and held in proper engagement with its seating notwithstanding wear and tear at the hinge which in an ordinary light might produce inaccurate seating or centering. It will also be understood that external pressure on the glass holder is efficiently resisted by the bolts and nuts owing so the centralized angle of pull on the glass holder and increasing external pressure will result in harder engagement between the nuts and the bevelled surfaces thus automatically maintaining accurate bedding of the glass holder on its seating.

The light shown in Figures 1 to 4 is a comparatively small light employing four retaining bolts D equidistantly spaced around the glass holder which is shaped with notches between the retaining lugs to leave webs $A^4$ which are bevelled to form a continuation of the bevelled surface on the glass holder. Figures 6, 7 and 8, illustrate a somewhat similar construction of small light which however is provided with only two retaining bolts equidistantly spaced from the hinge and from each other. In this example the glass holder is formed with a greater number of notches and bevelled webs $A^4$ than the construction shown in Figures 1 to 4, in order to substantially reduce the weight of the glass holder without diminishing its strength as set forth in the specification of my prior British Patent No. 113023.

The construction of light shown in Figures 9 and 10 is generally similar to that shown in Figures 1 to 4, but is fitted with a closing plate or plug E between the rubber-seating ring $C^4$ fitted in the main frame, and the outboard side of the glass holder, this plate being firmly pressed by the glass holder against the seating $C^4$ by means of the retaining bolts D and nuts $D'$ engaging with the retaining lugs on the main frame. This plate is generally used when the ship is travelling in rough seas and for lights situated near the water line, and it is dished at the centre and provided with a strip $E'$ across the dished portion which strip serves as a handle for enabling the plate or plug E to be readily handled in fitting or removing when the glass holder is open. By reason of the bevelled surface on the retaining lugs $A^2$ of the glass holder the force or thrust exerted by the clamping pressure due to screwing up the nuts D is such as to act directly on the closure between closing plate and the main frame and the closure between the glass holder and the main frame, as indicated by the dotted lines X and Y shown in Figure 13; in this figure the flange or projection $A^{3\times}$ that engages with the rubber seating $C^{3\times}$ fitted in the main frame C is formed with a middle V-shaped portion and two angular side portions which prevent the rubber ring $C^{3\times}$ from being splayed outwardly when the middle V-portion enters or bears against the rubber, as set forth in the specification of my prior British Patent 147333. This feature may be applied to any or all of the closures between the glass holder and the main frame or the closure between the glass holder and the cover or dead light. An example of a light fitted with a closing plate or plug E, and a cover or dead light F is shown in Figures 11 and 12. The cover or dead light F is fitted on the hinge pin $C^2$ and is provided with two retaining lugs $F'$ to receive swing or eye bolts $D^\times$ hinged to the main frame at points disposed between the swing bolts D which engage with the bevelled retaining lugs $A^2$ on the glass holder, the said bolts $D^\times$ having nuts $D'^\times$ for engaging with the lugs $F'$ on the cover F. The lugs $F'$ on the cover or dead light are inclined or bevelled upwardly from the main surface of the cover towards their outer ends. The bevelled surface of the glass holder is provided with a flange or annular projection $A^5$ which engages with a rubber seating $F^2$ in the cover or dead light F as shown in Figure 12, the flange or annular projection $A^5$ may be formed with angular portions on each side of the middle V-portion for preventing outward displacement of the rubber seating $F^2$ as described in connection with Figure 13.

Figure 14 shows one construction of fixed or non-opening light, in which a glass holder is mounted in the main frame by soft packing material and retained thereby by a ring $A^6$ more or less permanently secured to the main frame by a large number of screws $A^7$. This light is provided with a hinged cover or dead light having bevelled retaining lugs as described in connection with Figures 11 and 12. The cover or dead light in any of the foregoing examples may have bevelled hinged lugs and may also be provided with a bevelled outer circumferential part forming a continuation of the bevelled surfaces of the retaining lugs.

The light illustrated in Figures 15 and 16 whenever intended for ships' saloons, state cabins or the like, is provided with a hinged glass holder A having two sets of bevelled lugs $A'$, for fitting on two hinge pins $C^2$ as shown in Figure 15. The bevelled retaining lugs $A^2$ on the holder and the swing bolts D on the main frame are arranged as shown whilst the bevelled inboard surface of the glass holder is notched to provide bevelled webs or the like $A^4$. A screw G is provided in the main frame for engaging with any one of a series of holes in the glass holder for retaining the glass holder in a partially open position. The glass holder is formed with cross portions (united at the middle) extending across the inboard surface of the glass plate B. A suitably shaped closing plug or plate E may also be fitted between the glass holder and main frame as described in connection with Figures 9 to 13.

The nuts $D'$ and $D'^\times$ may be of any suitable kind but I prefer to use conical shaped nuts which have a longitudinal groove, such as shown in Figures 12 and 13 for example, which nuts require a special tool or spanner for manipulating them, it is also preferred to provide these nuts and also hexagonal nuts with flanges $D^2$ see Figures 1 to 4, 12 and 13 for example, to increase the bearing surface and enable the nut to extend right to the inner marginal edge of the glass holder without employing an unduly large and heavy nut. Although the glass holder in all examples of opening lights is provided with a bevelled surface around the same, it will be understood that the bevelled surface need not in all cases extend completely around the glass holder or to the hinge lugs, but may simply be provided on and adjacent to the retaining lugs in order that the clamping pressure caused by screwing up the nuts will exert a thrust or force which will effect and maintain an efficient closure under all conditions as hereinbefore specified.

What I claim and desire to secure by Letters Patent of the United States is:—

1. A ship's light comprising a main frame, a seating thereon, a glass holder adapted to be clamped against said seating, and clamping means cooperating with said main frame at points radially outside said seating and with said glass holder at points radially within said seating in order that clamping pressure may be exerted on the glass holder directly over said seating.

2. A ship's light comprising a main frame, a seating thereon, a glass holder adapted to be clamped against said seating, clamping surfaces extending substantially to the inner edge of said glass holder and clamping devices cooperating with said surfaces and with the main frame whereby the clamping pressure is applied in close proximity to the inner edge of the glass holder directly over said seating.

3. A ship's light comprising a main frame, a seating thereon, a glass holder adapted to be clamped against said seating, devices for clamping the glass holder against said seating, and means on said glass holder for enabling the clamping devices to assume inclined positions so as to enable the clamping pressure to be applied near the inner edge of the glass holder.

4. A ship's light comprising a main frame, a glass holder having surfaces which are inclined from the inner edge of the glass holder towards the outer edge so that the outer edge is further from the plane of the glass than the inner edge, and means for cooperating with the bevelled surfaces to clamp the glass holder against the main frame.

5. A ship's light comprising a main frame, screw devices cooperating therewith and a glass holder slotted to receive said screw devices and provided with bevelled surfaces adjacent to the slots said screw devices being adapted to cooperate with said bevelled surfaces to clamp the glass holder against the main frame.

6. A ship's light comprising a main frame, bolts attached thereto, a glass holder having slotted parts to receive said bolts, and formed with bevelled surfaces extending from the inner edge of the glass holder to the outer ends of said slotted parts, and nuts on said bolts adapted to bear on the said bevelled surfaces to cause the bolts to assume inclined positions with their outer or free ends directed towards the middle of the light.

7. A ship's light comprising a main frame, bolts pivoted thereon, a glass holder having slotted lugs to receive said bolts and having a bevelled inboard surface extending to the outer ends of said slotted lugs, and nuts on said bolts for bearing on the bevelled surfaces of the lugs to cause the bolts to take up inclined positions with their outer or free ends directed towards the middle of the light.

8. A ship's light comprising a main frame, a glass holder having surfaces which are inclined from the inner edge of the glass holder towards the outer edge so that the outer edge is further from the plane of the glass than the inner edge, said glass holder having peripheral recesses around its inboard surface to provide webs whose inboard surfaces are bevelled to agree with the bevelled surface of the glass holder and the lugs thereon, and means for cooperating with the bevelled surfaces to clamp the glass holder against the main frame.

9. A ship's light comprising a main frame, bolts pivoted thereto, a glass holder having slotted lugs, hinge lugs on the glass holder by means of which the glass holder is hinged to the main frame, a bevelled inboard surface on the glass holder extending to the ends of the hinge lugs and the slotted lugs and nuts on said bolts for bearing on the bevelled surfaces of the slotted lugs to cause the bolts to assume inclined positions with their outer or free ends directed towards the middle of the light.

10. A ship's light comprising a main frame, screw devices cooperating therewith and a glass holder having lugs which are bevelled and shaped to enable said screw devices to cooperate therewith in such manner as to exert clamping pressure on the glass holder to force it against the main frame at points near the inner edge of the glass holder.

11. A ship's light comprising a main frame, a hinged glass holder having a bevelled inboard surface which extends to the outer ends of slotted lugs on said holder, a closing plate fitted between said main frame and glass holder, swing bolts on said main frame for engaging with said slotted lugs and nuts on said bolts for bearing on the bevelled surfaces of the slotted lugs to cause the bolts to be inclined inwards towards the middle of the light.

12. A ship's light comprising a main frame, a glass holder provided with bevel lugs hinged to said frame, means for retaining said glass holder against the main frame, a cover or dead light adapted to bear on said glass holder, slotted parts on said cover which are bevelled to form bearing surfaces for nuts on bolts pivoted on the main frame, so as to cause the outer ends of the bolts to be inclined towards the middle of the light.

13. A ship's light having a hinged glass holder formed with strips extending in the form of a cross over the inboard surface of the glass, a bevelled marginal surface around said glass holder, hinge lugs on said glass holder, retaining lugs bevelled to have the same inclination as the marginal surface around the glass holder, and swing bolts having nuts for bearing on the bevelled surfaces of said retaining lugs.

14. A ship's light comprising a main frame with an opening therein, clamping devices co-operating with said frame, and a movable member for closing said opening, which member is slotted and provided with bevelled surfaces adjacent to said slots, said clamping devices being adapted to co-operate with said bevelled surfaces to clamp the said member in the closing position.

THOMAS UTLEY.